United States Patent [19]
Warner

[11] 3,834,315
[45] Sept. 10, 1974

[54] PNEUMATIC CONTROL SYSTEM FOR A TROLLEY DISPATCH NETWORK

[75] Inventor: Kent F. Warner, White Plains, N.Y.

[73] Assignee: W & H Conveyor Systems, Inc., Carlstadt, N.J.

[22] Filed: Apr. 6, 1973

[21] Appl. No.: 348,506

Related U.S. Application Data

[63] Continuation of Ser. No. 133,671, April 13, 1971, abandoned.

[52] U.S. Cl..................................... 104/88, 198/38
[51] Int. Cl............................................ B65g 17/42
[58] Field of Search............ 198/38; 104/88; 214/60

[56] References Cited
UNITED STATES PATENTS

| | | | |
|---|---|---|---|
| 2,201,013 | 5/1940 | Rosenthal | 104/88 |
| 2,714,355 | 8/1955 | Benson | 104/88 |
| 3,045,609 | 7/1962 | Brown, Jr. | 104/88 |
| 3,589,498 | 6/1971 | Cowan et al. | 198/38 |
| 3,605,627 | 9/1971 | Homeier et al. | 104/88 |

Primary Examiner—Frank E. Werner
Attorney, Agent, or Firm—Thomas B. Graham

[57] ABSTRACT

A trolley dispatch network in which a penumatic control system is provided to switch trolley carriers from the main rail to various spurs connected to receiving stations.

3 Claims, 5 Drawing Figures

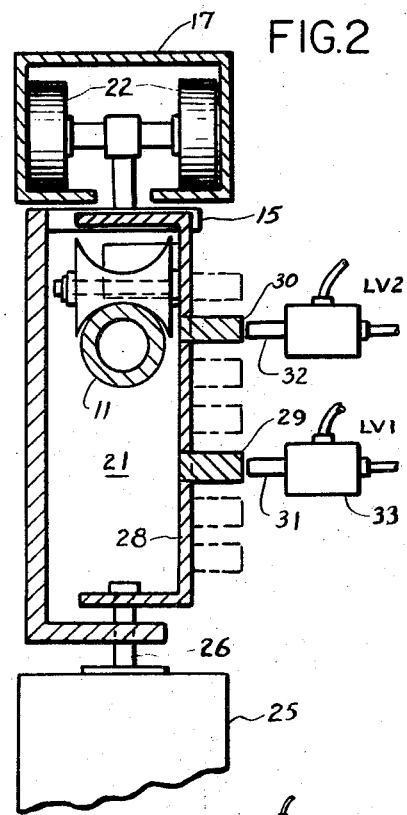
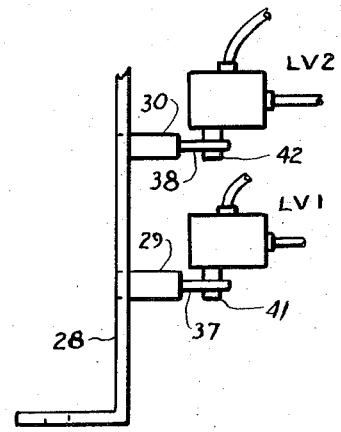
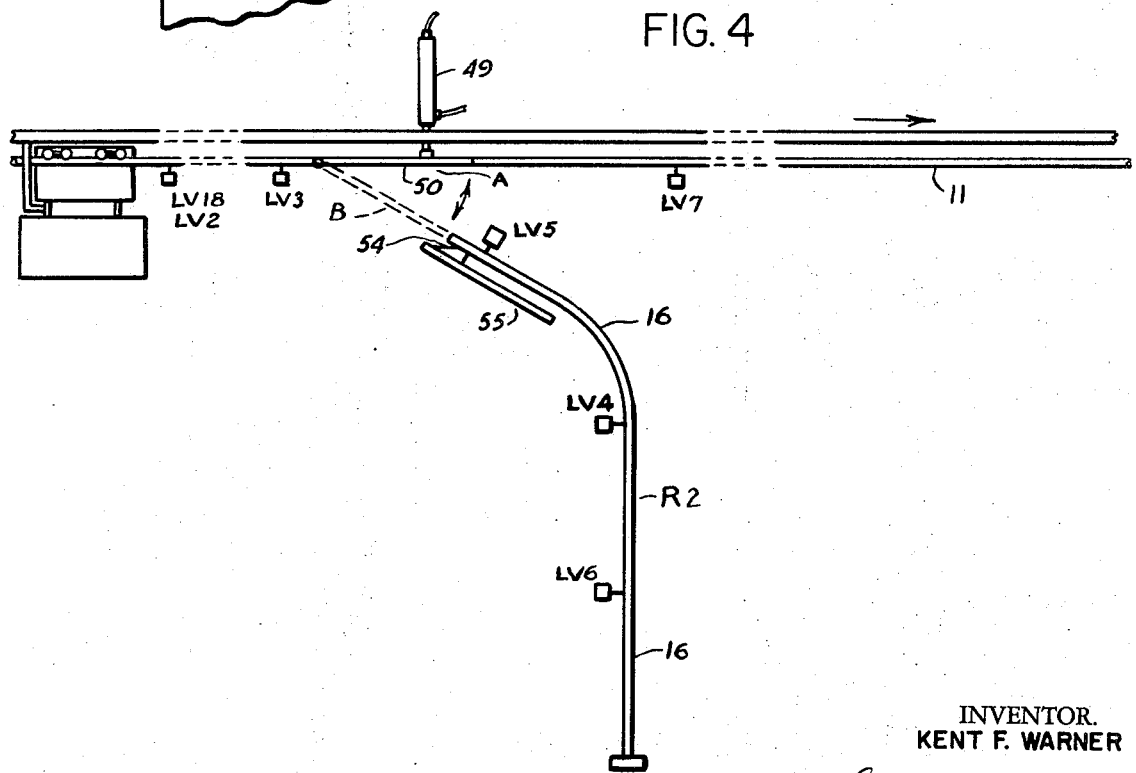

PNEUMATIC CONTROL SYSTEM FOR A TROLLEY DISPATCH NETWORK

RELATED APPLICATIONS

This application is a continuation of my copending application Ser. No. 133,671, filed Apr. 13, 1971, now abandoned.

DETAILED DESCRIPTION OF THE INVENTION

The present invention relates to a control system for guiding trolley carriers in a trolley dispatch network generally and more particularly, to a pneumatic control system which substantially simplifies the control system.

Prior known control systems for guiding the trolley carriers in trolley dispatch networks generally utilize electrical circuitries and servo-motors of rather complex arrangements in switching the trolley carriers from the main rail path to various spurs or branches of the network.

It is therefore a general object of the present invention to provide an improved, less costly, and simplified control system for a trolley dispatch network, and more particularly, to provide a control system which simplifies rather complex electrical arrangements required in prior systems.

These and other objects of the present invention are achieved by providing a pneumatic control system which includes a programmable destination code provided in the trolley carriers, pneumatic sensors disposed near the switch junctions between the main rail path and spurs branching out from the main rail path to various receiving stations, and pneumatic means responsive to the operation of the pneumatic sensors for operating the switches to divert the trolley carriers to particular spurs. The control system may further include means for pneumatically detecting the completion of the diversion of a trolley carrier to a spur and returning the switch to its original position in the main rail path.

Another feature of the present invention resides in the provision of a lockout sensor for locking out the switch in the switched position until the trolley carrier is completely transferred to the destination spur to avoid jamming of the trolley carrier in the switch.

Still another feature of the present invention resides in the provision of pneumatic means for sweeping the trolley carrier forward to the spur and out of the way from the switch to assure that the system is made available to other carriers destined for different receiving stations.

Still another feature resides in the provision of pneumatic means for detecting a fully loaded spur and means for locking the switch into its released or normal position in the main rail path.

These objects and features of the present invention will become more evident from the following detailed description taken in conjunction with the accompanying drawings in which:

FIG. 2 is a cross-sectional side view of the power conveyor belt, main rail, and a trolley carrier having destination coding elements, and pneumatic proximity detecting devices in accordance with the present invention.

FIG. 3 shows an alternative embodiment of a pneumatic detecting arrangement.

FIG. 4 is a schematic diagram of a section of the dispatch network showing a section of main rail, spur and switch means, and various pneumatic sensing elements for detecting the movements of the trolley carriers.

Figure 1:
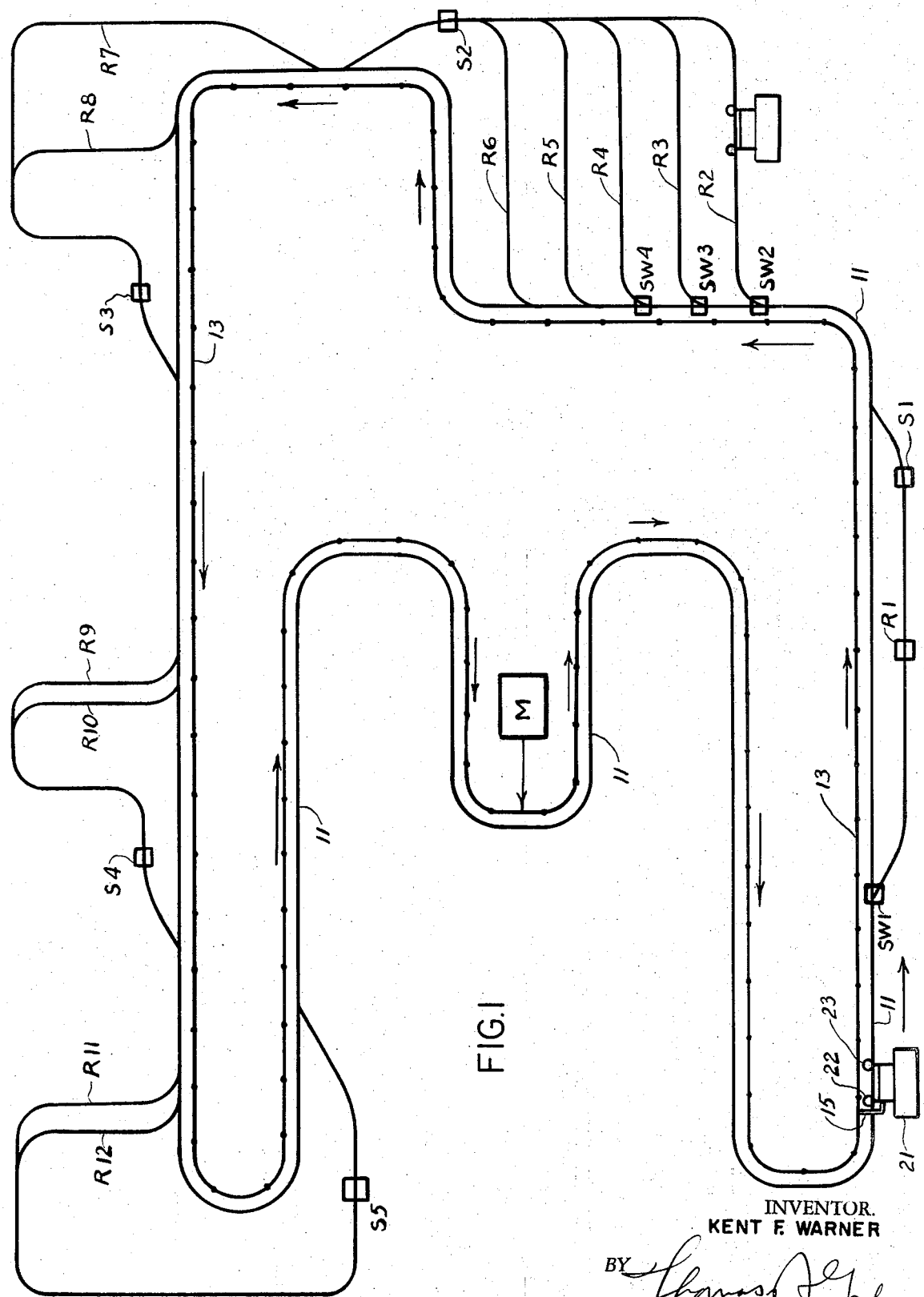
FIG. 1 is a schematic drawing of a typical trolley dispatch network in which a pneumatic control system is provided to guide the trolleys.

Referring to the drawings, and more particularly to FIG. 1, a trolley dispatch network typically includes a main rail path 11 which may zig-zag at the same or different elevations and which forms a complete loop. The network includes a plurality of sending and receiving stations positioned along various locations of the path 11. The receiving stations R1, R2, R3, . . . , may be positioned at suitable locations, such as storage areas at the same or different floors of a building. The receiving stations could be merely extensions of the free rail spurs, each having one end connected to the main rail path 11 and the other end to one of the sending stations S1, S2, S3, . . . , as shown schematically in FIG. 1. The sending stations could merely be the other ends of the rails, or segments of rail links which interconnect the plurality of the spurs to the main loop rail path.

The network may also include a power chain conveyor belt 13 driven by an electrical motor M for moving the pusher or dog 15, to transport the trolley carrier 21, the latter being coupled to the main rail 11 through a pair of rotary wheels 22 and 23. As shown in FIG. 2, a rack 25 may be coupled to the trolley carrier 21 by suitable linking arms 26 for carrying a load. The dog 15 is arranged so that one end thereof pushes the trolley carrier 21 and thereby moves the loading rack 25.

According to an aspect of the present invention each trolley carrier 21 is provided with a suitable means such as a board 28 having a plurality of pin receiving apertures for coding purposes so that selected apertures can be plugged with coding pins 29 and 30 to provide a binary code to indicate a particular receiving station to which it is destined. The code may include a combination of pins to be detected by code sensing means stationed along the main rail path just before a switching station the operation of which will divert the trolley carrier to a selected spur connected to a receiving station to which it is destined.

Referring to FIG. 2, the code sensing means may comprise code sensors LV1 and LV2 of the air proximity detection devices, such as G101A Proximity Sensors manufactured by General Fluidics Corporation, Paterson, N.J., which detect the presence of the code pins as they move within a predetermined distance. As shown, a receiving station is identified by the specific positions and arrangements the sensing elements 31 and 32 of the code sensors LV1 and LV2. The detection by the sensing elements of the simultaneous presence of all of the code pins forming a code indicates that the trolley carrier reached a particular station or free rail spur to which it is destined. Thus, for example, as illustrated in FIG. 2, in operating the system a operator positioned at a sending station can predetermine the destination of the trolley carrier 21 by inserting the two coding pins 29 and 30 into particular apertures of the board 28 which correspond to the positions of the two proximity detecting elements 31 and 32 of the code sensors LV1 and LV2 disposed at a particular switching station associated with a specific receiving station to which the operator wishes to send the trolley carrier.

FIG. 3 shows a coding arrangement wherein the code pins 29 and 30 are provided with contact arms 37 and 38, and code sensors LV1 and LV2 are provided with contact trip elements 41 and 42. As the trolley passes by the sensors LV1 and LV2, the contact arms 37 and 38 actuate the trip elements 41 and 42. The trip elements 41 and 42, in turn, will actuate the code sensors LV1 and LV2 and the logic circuits associated therewith. This coding arrangement eliminates the need for a close tolerance, for example, the 0.1 inch or less of spacing required between the code pins 29 and 30 and the proximity sensing elements 31 and 32 of the code sensors LV1 and LV2 in FIG. 2.

The pneumatic control system in accordance with the invention will now be described in conjunction with FIGS. 4 and 5 which show positions of various sensors used in relation to a spur of the network and various logic circuits connected to the sensors.

Figure 5:
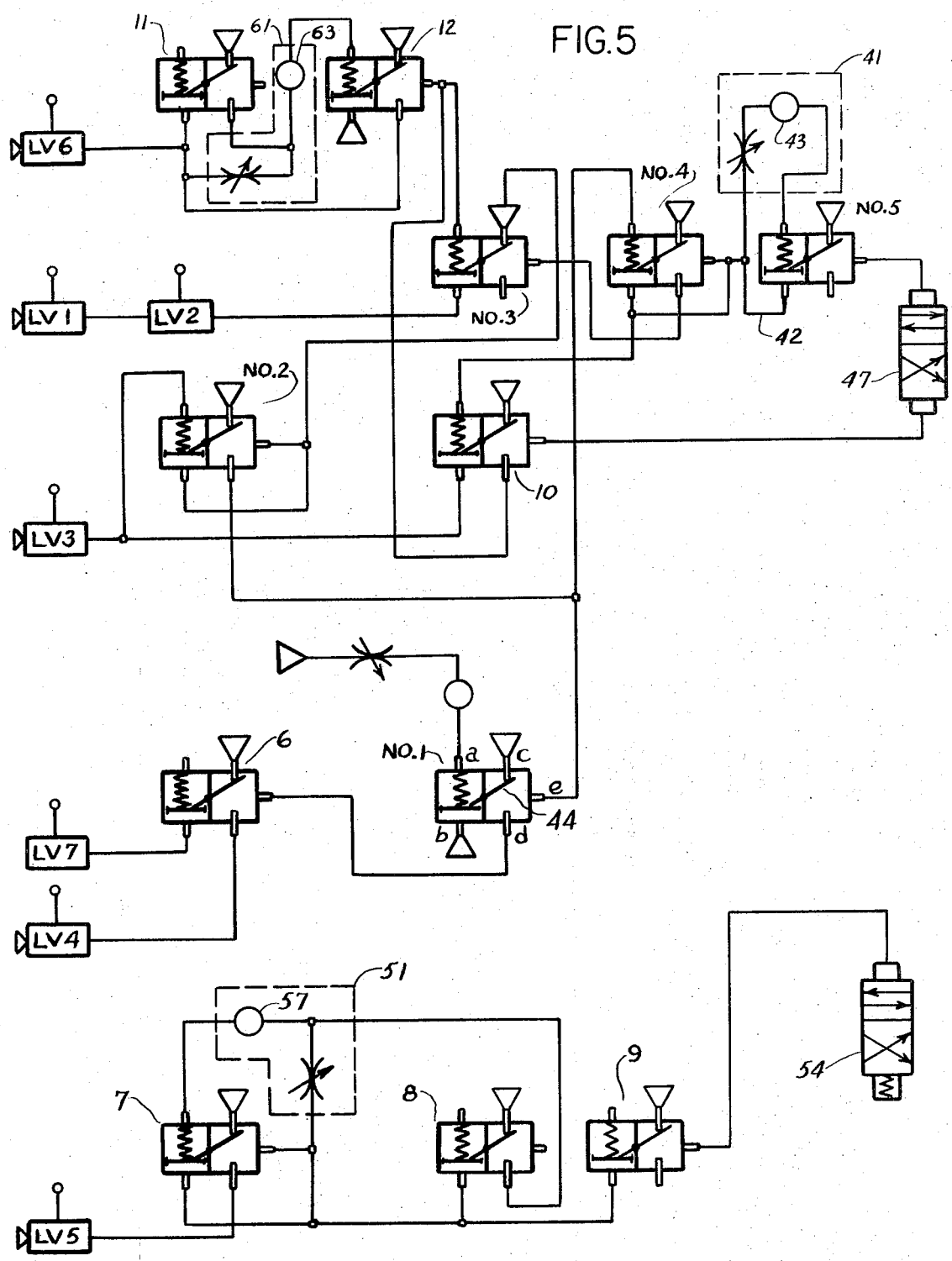
FIG. 5 is a schematic drawing of the pneumatic control logic network and sensors of the present invention.

The control system is essentially pneumatic and, comprises a plurality of air sensors and pneumatic logic units forming a plurality logic circuits as shown in FIG. 5. The respective sensors may be the G101A proximity sensors and the respective logic units each may be an air switch of the type which has an air-tight housing with five inlet and outlet ports, and means for opening the inlet port upon supply of an air stream through another of the inlet ports.

FIG. 5 schematically shows an arrangement of these logic units in their quiescent or unoperated states. When the air supply for the system is turned on, it actuates the logic unit No. 1 which in turn generates a long air pulse to reset the entire system. The impulse from the logic unit No. 1 operates unit No. 2 which remains in the actuated position. This prepares the logic unit No. 3 so that it can receive air from the logic No. 1 via the logic unit No. 2 and actuates the code sensors LV1 and LV2 so that their proximity sensing elements 31 and 32 can detect the presence of the proximity of the binary code pins 29 and 30 on the trolley 21. The system includes a pneumatic logic circuit for actuating an air cylinder 49 to move a switch from its normal position in the main path to its switched position connecting the main path to the spur.

This logic circuit is made of logic units No. 3, No. 4 and No. 5 connected in the manner which are actuable upon simultaneous detection of the code pins 29 and 30 of the code proximity sensors LV1 and LV2. With the code sensors LV1 and LV2 actuated, the logic unit No. 3 is energized to send a short pulse of air to the logic unit No. 4. In response, the logic unit No. 4 supplies an air stream while it remains in an actuated position. This air is then fed to the logic unit No. 5 through a time delay circuit 41 through a conduit 42. In response, the logic unit 5 is immediately actuated and remains actuated until the air stored in its reservoir 42 is released. The air pulse from the reservoir releases the logic unit No. 5 which then assumes its quiescent state. The logic unit No. 5 generates an air pulse when it is actuated and this air pulse operates an air pilot valve 47. The operated air pilot 47 operates the air cylinder 49. The operated air cylinder moves a linkage (not shown) which in turn moves the switch 50 from its position A in the main rail path to its switched position B in the spur path. Now the trolley carrier 21 can be diverted to the rail spur 15 of the receiving station. Once operated, the pilot valve 47 will remain in operated position and thus keep the switch in the switched position B. This will permit the trolley carrier 21 to move into the spur 16.

After the trolley carrier 15 passes the code sensors LV1 and LV2, it reaches another proximity sensor LV3 positioned adjacent the main rail 11 near the switch 50. This sensor LV3 locks out the logic units No. 3, No. 4 and No. 5 as explained below so that they maintain the pilot valve 47 in the actuated condition. Upon detecting the trolley carrier, the lock out sensor LV3 releases the actuated logic unit No. 2. This cuts off the air supply to the logic unit No. 3, and maintains it in the released position until the trolley carrier has moved onto the rail spur 16. Preferably, the spur can be tilted so that it helps the trolley carrier to move forward by gravity once it reaches the spur. This eliminates the need for a separate power supply and rail for the spurs and thereby simplifies the structure involved.

Another proximity sensor LV4 is positioned along the spur 16 for detecting the presence of the trolley in the spur, and a logic unit No. 6 is positioned between the sensor LV4 and the logic unit No. 1 as shown for resetting the divert logic unit No. 4. Upon detection of the trolley, the sensor LV4 applies an air pulse through the logic units No. 6 and No. 1 without actuating them. This air pulse then actuates the lockout logic unit No. 2 and returns the logic unit No. 4 to a neutral position and prepares the latter for a subsequent operation.

As shown in FIG. 4, the network may be provided with a sweep proximity sensor LV5 which detects presence of the trolley as it moves onto the spur from the main rail. As shown in FIG. 5, such a sweep sensor may be connected to a logic circuit having several logic units No. 7, No. 8 and No. 9 connected in the manner shown. Upon detection of the trolley carrier, the sweep sensor actuates these units. The logic circuitry is such that the logic unit No. 8 remains actuated for a predetermined time interval until a delay circuit 51 of the logic unit No. 7 deactivates the logic unit No. 8. While actuated, the logic unit No. 9 generates an air pulse for the duration while it empties the air accumulated in the reservoir 57 of the delay circuit 51 of the logic unit No. 7. This air pulse actuates a pilot valve 54. The actuated pilot valve 54 enables a sweep air cylinder 55, FIG. 4, provided adjacent the switch 50 to move the trolley completely off the conveyor switch 50.

At this point, the system is ready to handle other trolleys. If the next trolley is coded to go through the main rail 11 and bypass the spur 6, not all of the positions of binary code pins 29 and 30 will match the proximity detecting elements 31 and 32 of the sensor LV1 and LV2 and therefore will not operate the corresponding switch. The trolley will, however, actuate the lockout sensor LV3 to generate an output air pulse to actuate a logic unit No. 10 connected in the manner shown which has in the meantime been relieved of pressure when the diverting logic unit No. 4 has returned to a released position upon actuation of the reset sensor LV4. With the logic unit No. 10 actuated, a short air pulse is applied to the pilot valve 47 and this enables the air cylinder 49 to return the switch 50 from the switched position B to the through position A in the main rail path.

The system also includes means for pneumatically detecting whether or not a spur is fully loaded. For this purpose, a proximity sensor LV6 is provided to detect the loading of a spur to its full capacity when the spur is filled up with trolleys and the sensor is connected to logic units No. 11 and No. 12 in the manner shown. Upon detection of the full load spur, the sensor LV6 will actuate the logic units No. 11 and No. 12, and apply an air pulse to the logic unit No. 10 which will energize the pilot valve 47. This will release the switch 50 to the through position A in the main rail. As long as the spur sensor LV6 remains actuated, i.e., the spur is fully loaded, the pilot valve 47 cannot be operated and this will prevent the switch from moving into the switched position B in the spur. When a trolley moves out of the spur and deactivates the full spur sensor LV6, the logic unit No. 11 allows the logic unit No. 12 to return to the deactivated position quickly by the air being discharged from its reservoir 63 into the logic unit No. 12. This will leave the air cylinder deactivated and in its quiescent state and have it available for subsequent operation.

The system is further provided with another proximity reset sensor LV7 adjacent the main rail 11 behind the switch 50 as shown in FIG. 4. Upon detection of the trolley passing thereby, the reset sensor LV7 will actuate the logic unit No. 6 which in turn sends an air pulse to the unit No. 1 and reset the diverting logic unit No. 4 for a subsequent operation.

OPERATION OF THE PNEUMATIC CONTROL SYSTEM

In operating the system, the operator first sets the code pins on a trolley so that the in positions correspond to the detection elements of the code sensors associated with the receiving station to which the trolley is to be directed. The operator then places the trolley on the main rail 11. At this point, the dog 5 will engage the trolley carrier and transport it along the free rail until it reaches the code sensors LVI and LV2 having proximity sensing elements 31 and 32 which match the positions of the pins on the trolley. The sensors LV1 and LV2 then initiate the operation of the pneumatic logic units No. 3, No. 4 and No. 5 of the logic circuitry and the air cylinder 47 to throw the switch 50 into its switched position B in the rail spur 15. As the trolley proceeds beyond the sensors LV1 and LV2 it actuates the lockout air sensor LV3 which will lock out the air cylinder 47 and this will keep the switch 50 in the operated position and prevent it from returning to the released position. As the trolley goes onto the spur, it actuates the sweep sensor LV5 and the actuated sweep sensor LV5 will, in turn, energize the air cylinder 54 of the sweep mechanism 55. The sweep mechanism 55 actuates the cylinder 54 to move the trolley completely off the switch 50. This prevents the trolley from jamming the switch and tying up the rest of the system.

As the trolley moves on beyond the sweep mechanism 55 along the free rail spur 16, it energizes the reset sensor LV4 which de-energizes the lockout circuitry including the lockout sensor LV3, and de-energizes the air cylinder 49 of the switch 50 so that it is free to return to the released position A in the main rail path.

When the switch 50 is in a diverted or switched position B, and a trolley approaches the switch but destined for another receiving spur not associated with the switch, the trolley will energize the lockout sensor switch LV3. The lockout sensor LV3 will in turn actuate the air cylinder 49 to move the switch to the released position A and lock it in that position.

Afterwards, the trolley will pass the reset sensor LV7 to reset the logic circuitries so that the air cylinder 49 and the switch 50 are ready for operation for successive trolleys.

As the free rail spur 16 becomes filled with trolleys the last one will actuate the full spur sensor LV6 and the actuated full spur sensor LV6 will lock the air cylinder 49 in the released position so that additional trolleys cannot be switched into the spur.

What is claimed is:

1. A pneumatic control system for a trolley dispatch network having a plurality of sending stations coupled to a main rail, a plurality of receiving stations coupled to a plurality of rail spurs, a plurality of switches each associated with a spur and positionable in the main rail and moveable to a switched position for diverting a trolley carrier to the associated spur, comprising:

manipulatable coding means carried by each trolley carrier and arranged to identify the receiving station to which the trolley carrier is destined;

pneumatic detection means associated with each of the spurs for detecting the code elements on the trolley carrier;

pneumatic logic circuitry associated with said detection means and energizable upon the simultaneous detection of the code elements identifying the destination of the trolley to the associated spur; and pneumatic means actuable by said pneumatic logic circuitry for operating the associated switch to guide the trolley carrier to the spur coupled to the receiving station to which it is destined, said coding means including a predetermined number of code pins, and a perforated board, said board having a plurality of apertures for receiving pins in selected apertures to form a code identifying the receiving station to which carrier is destined, said pneumatic detection means including a plurality of proximity detecting elements, said elements being positioned to represent a receiving station associated therewith, each of said code pins including contact arm, and said pneumatic detection means include contact elements which are tripped by the contact arms as the trolley carrier passes by said detection means, said pneumatic means including a pneumatic valve and cylinder coupled to said switch, including means for pneumatically detecting the movement of a trolley onto a spur from the main rail and means for moving the trolley beyond said switch.

2. The pneumatic control system in accordance with claim 1, including means for pneumatically detecting a fully loaded spur and means for locking the switch in the main rail path to prevent diversion of additional trolleys onto the fully loaded spur.

3. The pneumatic control system in accordance with claim 2, including means for pneumatically locking the switch in the operated position in the main rail path and in the rail spur selectively while said trolley carrier is in transit and means for pneumatically releasing said switch after the trolley has arrived at its destination so that said switch is available for other trolley carriers.

* * * * *